United States Patent
Fukuta

(10) Patent No.: US 9,554,295 B2
(45) Date of Patent: Jan. 24, 2017

(54) SYSTEM AND METHOD FOR CONTROLLING A REPORT ABOUT LINK STATUS MONITORING RESULT ACQUIRED BY MOBILE STATION AND TRANSMITTED TO A BASE STATION

(75) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 36 days.

(21) Appl. No.: 13/878,168

(22) PCT Filed: Oct. 7, 2011

(86) PCT No.: PCT/JP2011/073248
§ 371 (c)(1),
(2), (4) Date: Apr. 5, 2013

(87) PCT Pub. No.: WO2012/046853
PCT Pub. Date: Apr. 12, 2012

(65) Prior Publication Data
US 2013/0189970 A1    Jul. 25, 2013

(30) Foreign Application Priority Data

Oct. 7, 2010  (JP) ................................ 2010-227815

(51) Int. Cl.
*H04W 24/10* (2009.01)
*H04W 4/02* (2009.01)
(Continued)

(52) U.S. Cl.
CPC ............. *H04W 24/10* (2013.01); *H04W 4/02* (2013.01); *H04W 16/14* (2013.01); *H04W 36/0083* (2013.01); *H04W 48/18* (2013.01)

(58) Field of Classification Search
CPC .............................. H04W 24/08; H04W 36/08
(Continued)

(56) References Cited

U.S. PATENT DOCUMENTS 8,644,827 B2 * 2/2014 Yamada et al. ............ 455/435.2
2010/0105377 A1  4/2010 Iwamura et al.
(Continued)

FOREIGN PATENT DOCUMENTS

WO   2008/084662 A1   7/2008
WO   2009/066622 A1   5/2009

OTHER PUBLICATIONS

An Office Action issued by the Korean Patent Office on Jun. 24, 2014, which corresponds to Korean Patent Application No. 10-2013-7008950 and is related to U.S. Appl. No. 13/878,168; with English language statement of relevance.

(Continued)

*Primary Examiner* — Chuong A Ngo
(74) *Attorney, Agent, or Firm* — Studebaker & Brackett PC

(57) ABSTRACT

A radio measurement collection method in one embodiment is provided with: a step (S142) wherein, in an idle state, radio-environment measurement is performed on a target LTE frequency band in accordance with measurement parameters set by an LTE base station (eNB); a step (S143) wherein, in an idle state, radio-environment measurement is performed on a frequency band for a non-LTE radio access technology and/or an LTE frequency band other than the target frequency band; and a step (S146) wherein, if the result of the measurement in step S142 is less than a threshold, the result of the measurement in step S142 and the result of the measurement in step S143 are both logged together with location information.

4 Claims, 5 Drawing Sheets

(51) Int. Cl.
*H04W 36/00* (2009.01)
*H04W 48/18* (2009.01)
*H04W 16/14* (2009.01)

(58) Field of Classification Search
USPC .................. 455/422.1, 424, 67.11, 436, 442;
370/328–338
See application file for complete search history.

(56) References Cited

U.S. PATENT DOCUMENTS

| | | | | |
|---|---|---|---|---|
| 2010/0208707 | A1* | 8/2010 | Hamabe et al. | ............... 370/332 |
| 2010/0267378 | A1* | 10/2010 | Hamabe et al. | ............... 455/423 |
| 2012/0040621 | A1* | 2/2012 | Jung et al. | ................. 455/67.11 |
| 2013/0072182 | A1* | 3/2013 | Jung | ..................... H04W 24/10 |
| | | | | 455/422.1 |

OTHER PUBLICATIONS

3GPP; "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; State 2 (Release 10)"; 3GPP TS 37.320; V1.0.0; Aug. 2010.
Cmcc et al.; 3GPP TSG-RAN WG2 Meeting #71; Neighboring Cell Measurements Logging and Reporting; R2-104552; Madrid, Spain; Aug. 23-27, 2010.
International Search Report; PCT/JP2011/073248; Nov. 8, 2011.
3GPP TS 37.320; V0.7.0 (Jun. 2010); 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10).
3GPP TR 36.805 V9.0.0 (Dec. 2009); 3rd Generation Partnership Project; Technical Specification Group Radio Access Network; Study on Minimization of drive-tests in Next Generation Networks; (Release 9).
An Office Action; "Notice of Reasons for Rejection," issued by the Japanese Patent Office on Aug. 27, 2013,which corresponds to Japanese Patent Application No. 2012-537779 and is related to U.S. Appl. No. 13/878,168; with Statement of Relevance.
3GPP TSG-RAN WG2 Meeting #71; Nokia Corporation, et al.; "Logged MDT when UE is Out of Service"; R2-104493; Madrid; Aug. 23-27, 2010.
The extended European search report issued by the European Patent Office on Jul. 22, 2016, which corresponds to European Patent Application No. 11830784.2-1505 and is related to U.S. Appl. No. 13/878,168.
3GPP; "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; Oct. 10, 2010; pp. 1-16; V1.0.1; 3GPP TS 37.320-101; France.

* cited by examiner

SYSTEM AND METHOD FOR CONTROLLING A REPORT ABOUT LINK STATUS MONITORING RESULT ACQUIRED BY MOBILE STATION AND TRANSMITTED TO A BASE STATION

TECHNICAL FIELD

The present invention relates to a radio measurement collection method and a radio terminal with which it is possible to measure a radio environment and collect a measurement result.

BACKGROUND ART

In case of mobile communication systems, if a building is constructed on the periphery of a radio base station and if the installation situation of the base stations on the periphery of the radio base station changes, then the radio environment related to this radio base station changes. Therefore, conventionally, an operator performs a drive test of measuring a radio environment using a measurement vehicle provided with a measurement equipment, and collecting a measurement result and location information.

Such measurement and collection, for example, may contribute to the optimization of the coverage of a radio base station, but face the problem of too many man-hours and high cost. In this regard, according to 3GPP (3rd Generation Partnership Project) which is a project aiming to standardize a mobile communication system, a radio terminal owned by a user is used to proceed with the specification design of MDT (Minimization of Drive Test) for automation of the measurement and collection (refer to Non Patent Literatures 1 and 2).

As a type of the MDT, there is a log-type MDT (hereinafter, appropriately Logged MDT). According to the Logged MDT, a radio terminal in an idle state (that is, a standby state) performs radio environment measurement according to a preset measurement parameter, logs a measurement result as MDT data together with location information and time information, and holds the MDT data in order to report the MDT data to a network later. Using the MDT, the operator is able to recognize a location (so-called a coverage hole) with low received power or received quality from a radio base station.

CITATION LIST

Non Patent Literature

[NPL 1] 3GPP TR36.805 V9.0.0 "Study on Minimization of drive-tests in Next Generation Networks", 2009-12
[NPL 2] 3GPP TS37.320 V0.7.0, "Radio measurement collection for Minimization of Drive Tests (MDT)", 2010-07

SUMMARY OF INVENTION

However, after an LTE (Long Term Evolution) technology with specifications designed in 3GPP is introduced, it is considered to use a radio access technology (RAT) of both an LTE technology and a CDMA technology (W-CDMA or CDMA 2000), and it is expected to provide a radio terminal corresponding to a plurality of RATs. Furthermore, after the LTE technology is introduced, it is expected to provide a radio terminal corresponding to a plurality of frequency bands.

There is a case in which even in a coverage hole at one frequency band of one RAT, the radio terminal corresponding to the plurality of RATs and/or the plurality of frequency bands is able to be switched to another RAT and/or another frequency band to perform communication. Accordingly, it is important for an operator to recognize whether the coverage hole at one frequency band of one RAT is covered by the other RAT and/or the other frequency band.

However, in the current MDT specifications, it is problematic that there is no structure for recognizing whether the coverage hole at one frequency band of one RAT is covered by the other RAT and/or the other frequency band.

Therefore, the present invention has been achieved in view of the above-described problems, and an object thereof is to provide a radio measurement collection method and a radio terminal with which it is possible to recognize whether a coverage hole at one frequency band of one RAT is covered by another RAT and/or another frequency band.

In order solve the problems, the present invention has following features. First, a feature of a radio measurement collection method is summarized as a radio measurement collection method performed by a radio terminal (radio terminal UE), comprising: a step (step S11) of receiving a measurement configuration message for setting a measurement parameter including a frequency band to be measured, from a radio base station (e.g. LTE base station eNB) of a predetermined radio access technology; a first measurement step (step S142) of, in an idle state, performing radio environment measurement with respect to the frequency band to be measured of the predetermined radio access technology according to the measurement parameter set by the measurement configuration message (e.g. MDT Configuration message); a second measurement step (step S143) of, in the idle state, performing radio environment measurement with respect to a radio access technology different from the predetermined radio access technology and/or a frequency band of the predetermined radio access technology other than the frequency band to be measured; and a step (step S146) of logging both a measurement result in the first measurement step and a measurement result in the second measurement step, together with location information, when the measurement result in the first measurement step is smaller than a threshold value.

According to such a feature, when the measurement result in the first measurement step is smaller than a threshold value (that is, a coverage hole), the radio terminal logs both a measurement result in the first measurement step and a measurement result in the second measurement step, together with the location information. In this way, it is possible to recognize whether a coverage hole at one frequency band of one RAT is covered by another RAT and/or another frequency band.

Another feature of the radio measurement collection method according to the present invention, in the radio measurement collection method according to the aforementioned feature, is summarized as follows. The radio measurement collection method comprises: a step (step S145) of logging the measurement result in the first measurement step together with the location information when the measurement result in the first measurement step is equal to or more than the threshold value.

Another feature of the radio measurement collection method according to the present invention, in the radio measurement collection method according to the aforementioned feature, is summarized as follows. In the step of logging, frequency band information that indicates a frequency band at which the measurement in the second measurement step has been performed, is further logged.

A feature of a radio measurement collection method is summarized as a radio measurement collection method performed by a radio terminal (radio terminal UE), comprising: a step (step S11) of receiving a measurement configuration message (e.g. MDT Configuration message) for setting a measurement parameter including a frequency band to be measured, from a radio base station (e.g. LTE base station eNB) of a predetermined radio access technology; a step (step S143) of, in an idle state, performing radio environment measurement with respect to a radio access technology different from the predetermined radio access technology and/or a frequency band of the predetermined radio access technology other than the frequency band to be measured; and a step (step S146) of logging a measurement result in the step of performing the measurement, frequency band information indicating a frequency band at which the measurement in the step of performing the measurement has been performed, and location information.

Another feature of the radio measurement collection method according to the present invention, in the radio measurement collection method according to the aforementioned feature, is summarized as follows. The radio measurement collection method further comprises: a step (step S18) of transmitting the frequency band information logged in the step of logging to a radio base station of the predetermined radio access technology, together with the measurement result and the location information, after the radio terminal is transitioned from an idle state to a connected state.

A feature of a radio terminal is summarized as a radio terminal comprising: a reception unit (radio communication unit 210) that receives a measurement configuration message (e.g. MDT Configuration message) for setting a measurement parameter including a frequency band to be measured, from a radio base station (e.g. LTE base station eNB) of a predetermined radio access technology; a first measurement unit (first measurement unit 261) that, in an idle state, performs radio environment measurement with respect to the frequency band to be measured of the predetermined radio access technology according to the measurement parameter set by the measurement configuration message; a second measurement unit (second measurement unit 262) that, in the idle state, performs radio environment measurement with respect to a radio access technology different from the predetermined radio access technology and/or a frequency band of the predetermined radio access technology other than the frequency band to be measured; and a logging unit (logging unit 263) that logs both a measurement result in the first measurement unit and a measurement result in the second measurement unit, together with location information, when the measurement result in the first measurement unit is smaller than a threshold value.

Another feature of the radio terminal according to the present invention, in the radio terminal according to the aforementioned feature, is summarized as follows. The logging unit further logs frequency band information indicating a frequency band at which the measurement has been performed by the second measurement unit.

A feature of a radio terminal is summarized as a radio terminal comprising: a reception unit (radio communication unit 210) that receives a measurement configuration message (e.g. MDT Configuration message) for setting a measurement parameter including a frequency band to be measured from a radio base station (e.g. LTE base station eNB) of a predetermined radio access technology; a measurement unit (second measurement unit 262) that, in an idle state, performs radio environment measurement with respect to a radio access technology different from the predetermined radio access technology and/or a frequency band of the predetermined radio access technology other than the frequency band to be measured; and a logging unit (logging unit 263) that logs a measurement result of the measurement unit, frequency band information indicating a frequency band at which the measurement has been performed by the measurement unit, and location information.

Another feature of the radio terminal according to the present invention, in the radio terminal according to the aforementioned feature, is summarized as follows. The radio terminal further comprises: a transmission unit (report processing unit 264 and radio communication unit 210) that transmits the frequency band information logged by the logging unit to a radio base station of the predetermined radio access technology, together with the measurement result and the location information after the radio terminal is transitioned from an idle state to a connected state.

DESCRIPTION OF EMBODIMENTS

Figure 1:
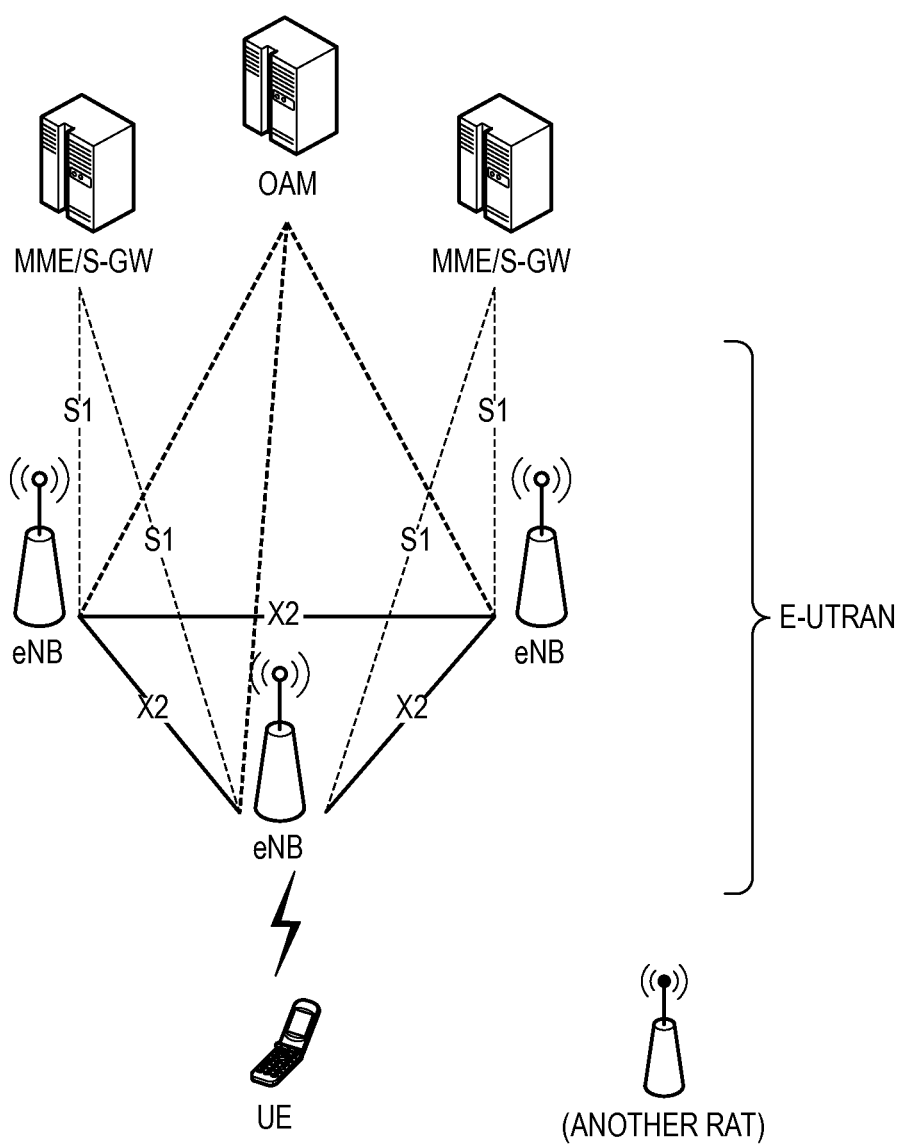
FIG. 1 is a diagram illustrating an entire schematic configuration of a mobile communication system according to an embodiment of the present invention.

With reference to the accompanying drawings, an embodiment of the present invention will be described in the sequence of (1) Overview of mobile communication system, (2) Configuration of LTE base station, (3) Configuration of ratio terminal, (4) Radio measurement collection method, (5) Effect of embodiment, and (6) Other embodiments. It is to be noted that the same or similar reference numerals are applied to the same or similar parts through the drawings in the following embodiments.

A radio measurement collection method according to the present embodiment is a radio measurement collection method performed by a radio terminal, and includes: a step of receiving an MDT Configuration message (corresponding to a measurement configuration message) for setting a measurement parameter including a frequency band to be measured from an LTE base station (corresponding to a radio base station of a predetermined radio access technology); a first measurement step of, in an idle state, performing radio environment measurement with respect to an LTE frequency band to be measured according to the measurement parameter set by the MDT Configuration message; a second measurement step of, in the idle state, performing radio environment measurement with respect to a radio access technology different from LTE and/or an LTE frequency band other than the frequency band to be measured; and a step of logging both a measurement result in the first measurement step and a measurement result in the second measurement step, together with location information when the measurement result in the first measurement step is smaller than a threshold value.

Furthermore, in the present embodiment, in the step of logging, frequency band information that indicates a frequency band at which the measurement in the second measurement step has been performed, is further logged.

(1) Overview of Mobile Communication System

FIG. 1 is a diagram illustrating an entire schematic configuration of a mobile communication system 1 according to the present embodiment.

As illustrated in FIG. 1, the mobile communication system 1 includes a radio terminal UE (User Equipment), a plurality of radio base stations eNB (evolved Node-B), an operation and maintenance device OAM (Operation and Maintenance), and a mobility management device MME (Mobility Management Entity)/a gateway device S-GW (Serving Gateway).

The plurality of radio base stations eNB constitute E-UTRAN (Evolved-UMTS Terrestrial Radio Access Network). Each of the plurality of radio base stations eNB forms a cell that is a communication area where a service should be provided to the radio terminal UE. Note that an LTE radio base station is called as an "LTE base station" in the following, where appropriate.

Each of the adjacent radio base stations eNB can communicate mutually via an X2 interface which is a logical communication channel to provide communication between the base stations. Each of the plurality of radio base stations eNB can communicate with EPC (Evolved Packet Core), specifically, the MME/S-GW via an S1 interface. Furthermore, each radio base station eNB can communicate with the operation and maintenance device OAM managed by an operator.

Note that the E-UTRAN and the operation and maintenance device OAM are together called as "Network" in the following, where appropriate. However, a radio access network of different RAT may be included in the "Network".

The radio terminal UE is a radio communication device owned by a user, and is also called as "User Equipment". The radio terminal UE is compatible with a plurality of RATs. In the present embodiment, the radio terminal UE is compatible with LTE and CDMA 2000.

Furthermore, the radio terminal UE is compatible with a plurality of frequency bands. In the present embodiment, the radio terminal UE is compatible with a frequency band 1 of LTE, a frequency band 2 of LTE, and a frequency band 3 of CDMA 2000.

The mobile communication system 1 supports MDT (specifically, Logged MDT). According to the Logged MDT, a radio terminal in an idle state performs radio environment measurement according to a preset measurement parameter, logs a measurement result as MDT data together with location information and a time stamp, and holds the MDT data in order to report the MDT data to a network later. Using the MDT, the operator is able to recognize a location (so-called a coverage hole) with low received power or received quality from a radio base station.

Figure 2:
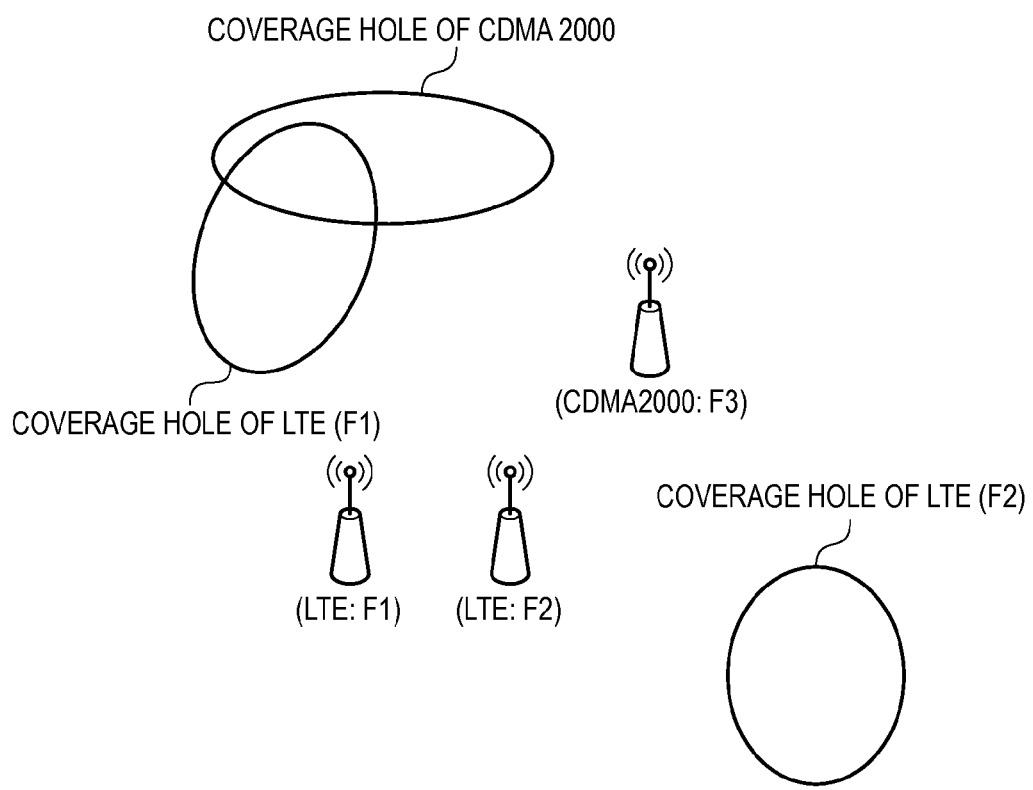
FIG. 2 is a diagram for explaining one example in which a communication area of an LTE base station of a frequency band F1, a communication area of an LTE base station of a frequency band F2, and a communication area of a radio base station of CDMA 2000 (a frequency band F3) overlap one another.

FIG. 2 is a diagram for explaining one example in which a communication area of an LTE base station of a frequency band F1, a communication area of an LTE base station of a frequency band F2, and a communication area of a radio base station of CDMA 2000 (a frequency band F3) overlap one another. Note that the radio base station of CDMA 2000 is called as a "CDMA 2000 base station" in the following, where appropriate.

As illustrated in FIG. 2, each of the communication area of the LTE base station of the frequency band F1, the communication area of the LTE base station of the frequency band F2, and the communication area of the CDMA 2000 base station includes a coverage hole.

A coverage hole of the LTE (the frequency band F1) is covered by the LTE (the frequency band F2) and the CDMA 2000. When a radio terminal UE performing communication using the LTE (the frequency band F1) moves into the coverage hole of the LTE (the frequency band F1), the radio terminal UE is able to continuously perform communication by performing handover to the LTE base station of the frequency band F2 or the CDMA 2000 base station.

A coverage hole of the LTE (the frequency band F2) is covered by the LTE (the frequency band F1) and the CDMA 2000. When a radio terminal UE performing communication using the LTE (the frequency band F2) moves into the coverage hole of the LTE (the frequency band F2), the radio terminal UE is able to continuously perform communication by performing handover to the LTE base station of the frequency band F1 or the CDMA 2000 base station.

A coverage hole of the CDMA 2000 is covered by the LTE (the frequency band F1) and the LTE (the frequency band F2). When a radio terminal UE performing communication using the CDMA 2000 moves into the coverage hole of the CDMA 2000, the radio terminal UE is able to continuously perform communication by performing handover to the LTE base station of the frequency band F1 or the LTE base station of the frequency band F2.

Meanwhile, at a location where the coverage holes of the LTE (the frequency band F1), the LTE (the frequency band F2), and the CDMA 2000 overlap one another, since it is probable that communication of the radio terminal UE in a connected state is interrupted, it is necessary to quickly perform handling.

Accordingly, it is important for an operator to recognize whether the coverage hole at one frequency band of one RAT is covered by the other RAT and/or the other frequency band.

(2) Configuration of LTE Base Station

Figure 3:
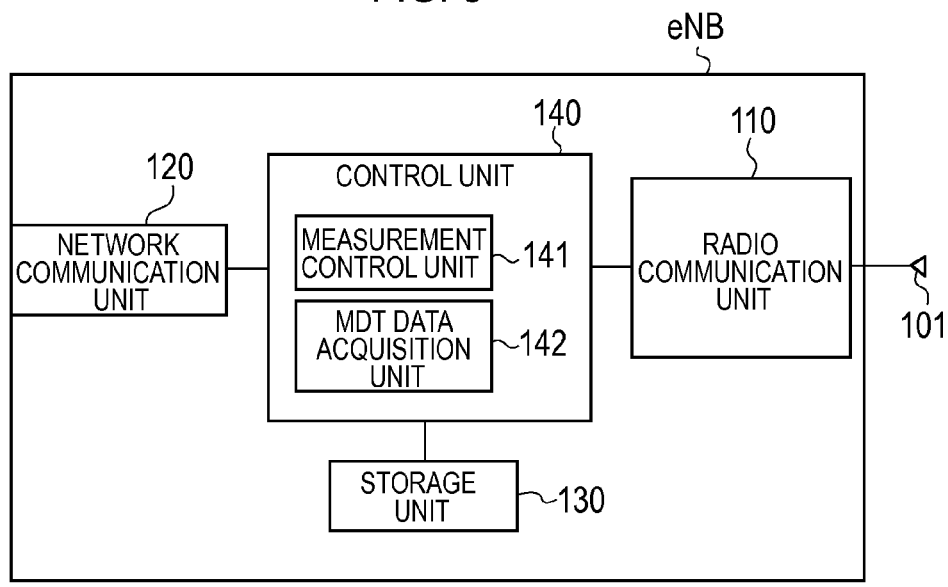
FIG. 3 is a block diagram illustrating a configuration of the LTE base station according to the embodiment of the present invention.

FIG. 3 is a block diagram illustrating a configuration of the LTE base station eNB according to the present embodiment.

As illustrated in FIG. 3, the LTE base station eNB includes an antenna 101, a radio communication unit 110, a network communication unit 120, a storage unit 130, and a control unit 140.

The antenna 101 is used for transmitting and receiving a radio signal. The radio communication unit 110 is configured by using a radio frequency (RF) circuit and a base band (BB) circuit, for example, and transmits and receives a radio signal via the antenna 101. Furthermore, the radio communication unit 110 modulates a transmission signal and demodulates a reception signal. The network communication unit 120 is configured to perform communication with other network devices (such as the operation and maintenance device OAM and other LTE base stations eNB). The storage unit 130 is configured by using a memory, for example, and stores different types of information used, for example, for controlling the LTE base station eNB. The control unit 140 is configured by using CPU, for example, and controls various functions provided in the LTE base station eNB.

The control unit 140 includes a measurement control unit 141 and an MDT data acquisition unit 142.

The measurement control unit 141 generates an MDT Configuration message for setting a measurement parameter in a radio terminal UE, and controls the radio communication unit 110 such that the MDT Configuration message is transmitted to the radio terminal UE. The measurement parameter includes a frequency band to be measured (measurements to be logged), a measurement trigger (triggering of logging event), a measurement duration (total duration of logging), an absolute time (network absolute time stamp), and a measurement area (measurement area). However, the measurement area (measurement area) may not be included in the measurement parameter.

The MDT data acquisition unit 142 performs a process of acquiring MDT data from a radio terminal UE transitioned from an idle state (a standby state) to a connected state (a state during communication). Specifically, after the radio communication unit 110 receives an RRCConnectionSetupComplete message including holding information (also called as Availability Indicator) indicating that the radio terminal UE holds the MDT data, when it is determined to acquire the MDT data from the radio terminal UE by the network, the MDT data acquisition unit 142 generates a UEInformationRequest message and controls the radio communication unit 110 such that the generated UEInformationRequest message is transmitted to the radio terminal UE.

When the radio communication unit 110 receives a UEInformationResponse message transmitted (reported) from the radio terminal UE in response to the UEInformationRequest message, the MDT data acquisition unit 142 acquires the MDT data included in the received UEInformationResponse message.

Then, the MDT data acquisition unit 142 controls the network communication unit 120 such that the acquired MDT data is transmitted to the operation and maintenance device OAM. In addition, as well as the case in which the MDT data is transmitted to the operation and maintenance device OAM, the MDT data acquisition unit 142 may interpret the content of the MDT data and use the MDT data in order to optimize a parameter of the LTE base station eNB.

(3) Configuration of Radio Terminal

Figure 4:
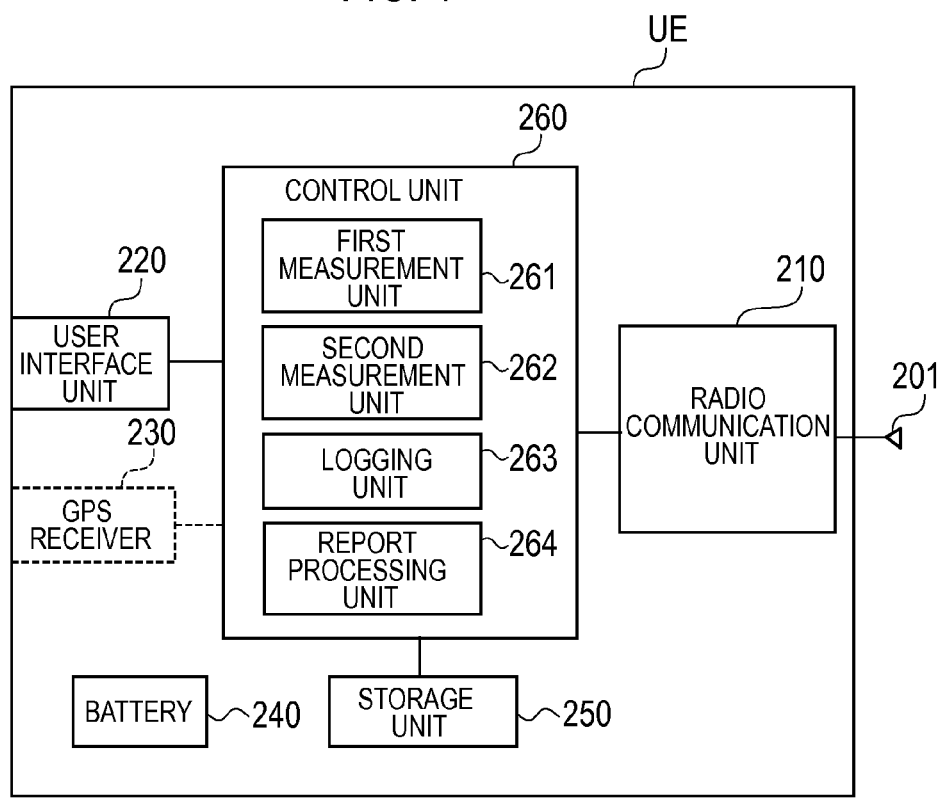
FIG. 4 is a block diagram illustrating a configuration of a radio terminal according to the embodiment of the present invention.

FIG. 4 is a block diagram illustrating a configuration of the radio terminal UE according to the present embodiment.

As illustrated in FIG. 4, the radio terminal UE includes an antenna 201, a radio communication unit 210, a user interface unit 220, a GPS receiver 230, a battery 240, a storage unit 250, and a control unit 260. However, the radio terminal UE need not include the GPS receiver 230.

The antenna 201 is used for transmitting and receiving radio signals. The radio communication unit 210 is configured by using a radio frequency (RF) circuit and a base band (BB) circuit, for example, and transmits and receives a radio signal via the antenna 201. Furthermore, the radio communication unit 210 modulates the transmission signal and demodulates the reception signal. In the present embodiment, the radio communication unit 210 is compatible with each of the LTE (the frequency band F1), the LTE (the frequency band F2), and the CDMA 2000 (the frequency band F3). The user interface unit 220 is a display, a button, or the like that functions as an interface with the user. The battery 240 is configured to charge an electric power supplied to each block of the radio terminal UE. The storage unit 250 is configured by using a memory, for example, and stores different types of information used for controlling the radio terminal UE, for example. The control unit 260 is configured, for example, using CPU, and controls various functions provided in the radio terminal UE.

The control unit 260 includes a first measurement unit 261, a second measurement unit 262, a logging unit 263, and a report processing unit 264.

In the connected state, when the radio communication unit 210 receives the MDT Configuration message from the LTE base station eNB, the first measurement unit 261 sets the measurement parameter included in the received MDT Configuration message.

In the present embodiment, the radio communication unit 210 corresponds to a reception unit that receives the MDT Configuration message for setting a measurement parameter including a frequency band to be measured. As described above, the measurement parameter includes the frequency band to be measured, the measurement trigger, the measurement duration, the absolute time, and the measurement area. However, the measurement area may not be included in the measurement parameter.

In the idle state, the first measurement unit 261 performs radio environment measurement with respect to an LTE frequency band to be measured according to a measurement parameter stored in the storage unit 250. In addition, the radio environment, for example, includes reference signal received power (RSRP) or reference signal received quality (RSRQ).

The second measurement unit 262 performs radio environment measurement with respect to RAT different from LTE (CDMA 2000 in the present embodiment) and/or an LTE frequency band other than the frequency band to be measured. Furthermore, when performing the radio environment measurement with respect to the RAT different from LIE, the second measurement unit 262 may perform the measurement with respect to a frequency band equal to the LTE frequency band to be measured or may perform the measurement with respect to a frequency band different from the LTE frequency band to be measured.

The logging unit 263 logs MDT data including a measurement result of the first measurement unit 261, location information, and a time stamp (that is, stores the MDT data in the storage unit 250). The location information includes ECGI (E-UTRAN Cell Global Identifier) of a serving cell. Furthermore, when the radio terminal UE has a positioning function, the location information further includes GNSS (Global Navigation Satellite System) location information. Meanwhile, when the radio terminal UE has no positioning function, the location information further includes an RF (Radio frequency) fingerprint related to a reception state from a neighboring cell. The time stamp indicates time information employing an absolute time included in the measurement parameter as a reference.

When the measurement result (the RSRP and/or the RSRQ) by the first measurement unit 261 is smaller than a threshold value, the logging unit 263 logs MDT data including the measurement result of the second measurement unit 262, location information, a time stamp, and frequency band information indicating a frequency band at which the measurement is performed by the second measurement unit 262, in addition to the measurement result by the first measurement unit 261.

For example, in the case in which a frequency band to be measured is the frequency band F1, when the second measurement unit 262 performs measurement with respect to the LTE frequency band F2, the logging unit 263 logs frequency band information indicating the frequency band F2 with associating the frequency band information with a measurement result of the frequency band F2. Furthermore, in the case in which the frequency band to be measured is the frequency band F1, when the second measurement unit 262 performs measurement with respect to the frequency band F3 of the CDMA 2000, the logging unit 263 logs frequency band information indicating the frequency band F3 with associating the frequency band information with a measurement result of the frequency band F3.

The report processing unit 264 performs a process of reporting held MDT data to the network. Specifically, when the radio terminal UE is transitioned from the idle state to the connected state, the report processing unit 264 transmits, to the network, holding information (Availability Indicator) indicating that the MDT data is held. Specifically, the radio terminal UE allows the holding information to be included in an RRCConnectionSetupComplete message indicating that the setup of the connected state is completed, and transmits the RRCConnectionSetupComplete message to the network.

Then, when the radio communication unit 210 receives the UEInformationRequest message that requests the transmission of the MDT data, the report processing unit 264 controls the radio communication unit 210 such that the UEInformationResponse message including the held MDT data is transmitted to the network. In the present embodiment, the report processing unit 264 and the radio communication unit 210 correspond to a transmission unit configured to transmit the MDT data including frequency band information to be, which is included in the UEInformationResponse message.

(4) Radio Measurement Collection Method

Next, a radio measurement collection method according to the present embodiment will be described in the sequence of (4.1) Entire schematic operation and (4.2) Logging process.

(4.1) Entire Schematic Operation

Figure 5:
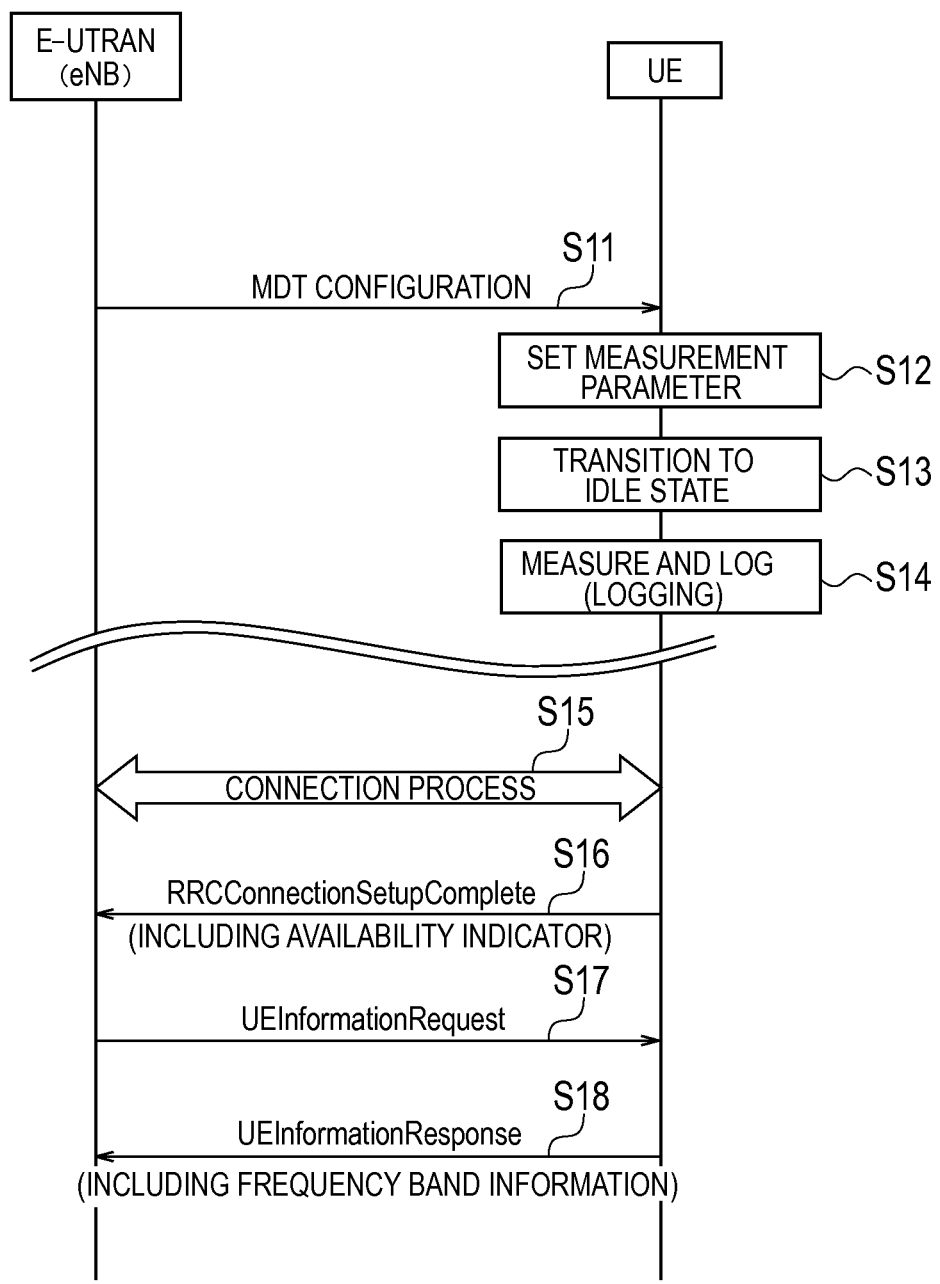
FIG. 5 is an entire schematic sequence diagram illustrating a radio measurement collection method according to the embodiment of the present invention.

FIG. 5 is an entire schematic sequence diagram illustrating the radio measurement collection method according to the present embodiment.

As illustrated in FIG. 5, in step S11, the LTE base station eNB included in the E-UTRAN transmits an MDT Configuration message to the radio terminal UE in a connected state. The radio terminal UE receives the MDT Configuration message.

In step S12, the radio terminal UE sets a measurement parameter included in the received MDT Configuration message. Furthermore, the radio terminal UE activates a measurement duration timer (duration timer).

In step S13, the radio terminal UE is transitioned from the connected state to an idle state.

In step S14, the radio terminal UE performs radio environment measurement according to the measurement parameter, and logs MDT data including a measurement result, location information, and a time stamp. Such a process may be called as "logging". Details of the logging process will be described later.

In step S15, the radio terminal UE performs a connection process with the LTE base station eNB included in the E-UTRAN. Furthermore, it is highly probable that the LTE base station eNB serving as a connection destination is different from a transmission source base station of the MDT Configuration message.

In step S16, the radio terminal UE transmits an RRCConnectionSetupComplete message including holding information (Availability Indicator) to the LTE base station eNB. The LTE base station eNB receives the RRCConnectionSetupComplete message. In addition, at the time point at which the LTE base station eNB is able to correctly receive the RRCConnectionSetupComplete message, the radio terminal UE completes transition to the connected state from the idle state.

In step S17, when MDT data is acquired from the radio terminal UE, the LTE base station eNB transmits a UEInformationRequest message to the radio terminal UE. The radio terminal UE receives the UEInformationRequest message.

In step S18, the radio terminal UE transmits a UEInformationResponse message including the MDT data to the LTE base station eNB in response to the UEInformationRequest message. When the UEInformationResponse message is received, the LTE base station eNB transmits the acquired MDT data to the operation and maintenance device OAM. In addition, the LTE base station eNB may interpret the content of the MDT data and may use the MDT data in order to optimize its own parameter.

(4.2) Logging Process

Figure 6:
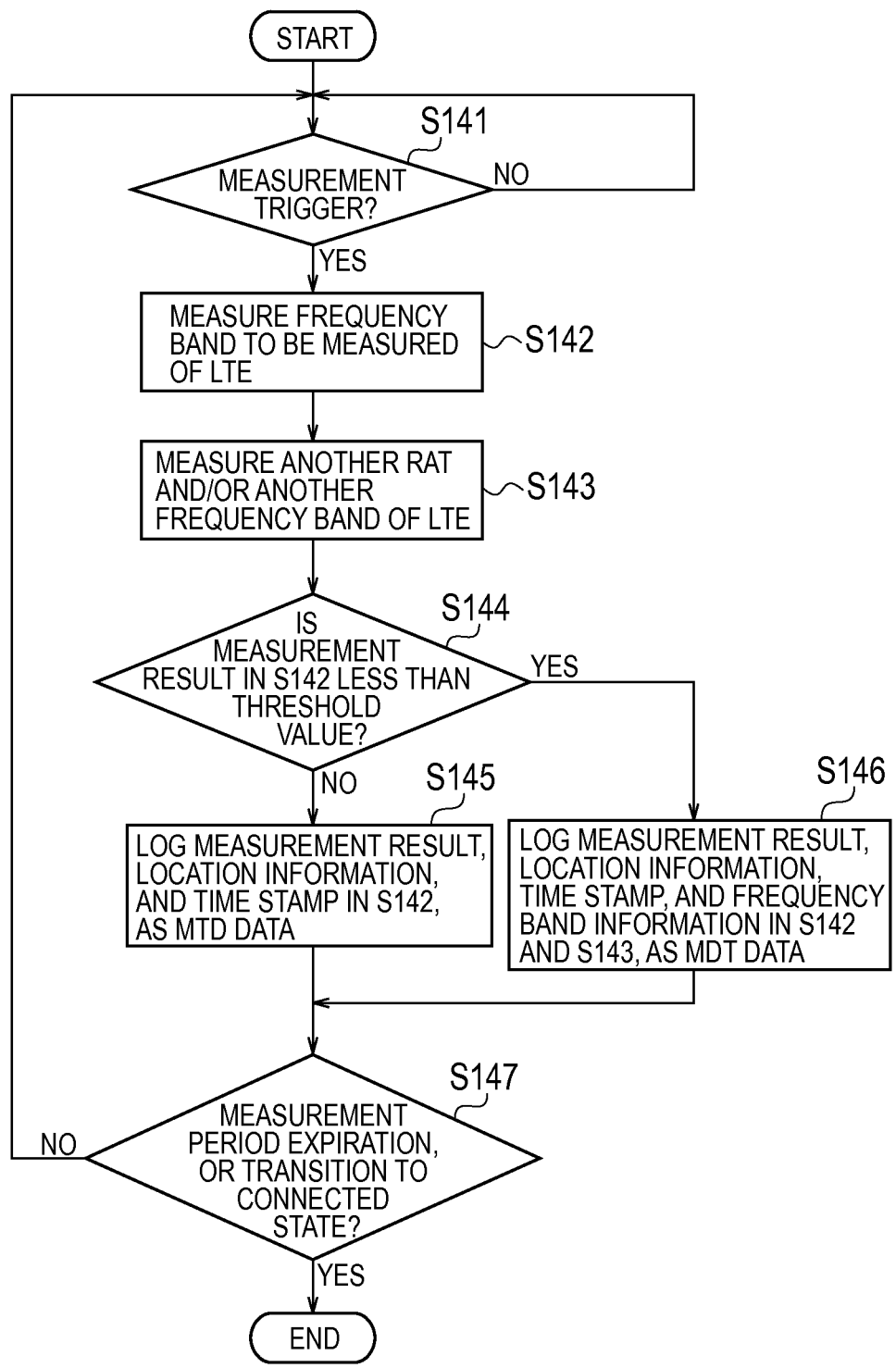
FIG. 6 is a flowchart illustrating details of a logging process according to the embodiment of the present invention.

Next, the logging process (that is, details of step S14 of FIG. 5) will be described. FIG. 6 is a flowchart illustrating details of the logging process.

In step S141, the first measurement unit 261 of the radio terminal UE confirms whether an event corresponding to a measurement trigger included in the measurement parameter that is set from the LTE base station eNB occurs. When the event occurred, the procedure proceeds to step S142.

In step S142, the first measurement unit 261 performs measurement of a radio environment (specifically, RSRP and RSRQ) with respect to a frequency band to be measured included in the measurement parameter that is set from the LTE base station eNB. Furthermore, the first measurement unit 261 performs measurement with respect to LTE.

In step S143, the second measurement unit 262 performs measurement of a radio environment (specifically, RSRP and RSRQ) with respect to RAT different from LTE (CDMA 2000 in the present embodiment) and/or an LTE frequency band other than the frequency band to be measured.

In step S144, the logging unit 263 compares the RSRP measured by the first measurement unit 261 with a threshold value 1 and compares the RSRQ measured by the first measurement unit 261 with a threshold value 2. When the RSRP and the RSRQ are equal to or more than the threshold values, the procedure proceeds to step S145. Meanwhile, when at least one of the RSRP and the RSRQ is smaller more than the threshold values, the procedure proceeds to step S146.

In step S145, the logging unit 263 logs MDT data corresponding to step S142, that is, MDT data including the measurement result (the RSRP and the RSRQ) in step S142, location information indicating a location when the measurement was performed in step S142, and a time stamp indicating a time when the measurement was performed in step S142.

Meanwhile, in step S146, the logging unit 263 logs the MDT data corresponding to step S142 and MDT data corresponding to step S143. Specifically, in addition to the MDT data including the measurement result (the RSRP and the RSRQ) in step S142, the location information indicating the location when the measurement was performed in step S142, and the time stamp indicating the time when the measurement was performed in step S142, the logging unit 263 logs MDT data including the measurement result (the RSRP and the RSRQ) in step S143, location information indicating a location when the measurement was performed in step S143, a time stamp indicating a time when the measurement was performed in step S143, and frequency band information indicating a frequency band at which the measurement was performed in step S143. In addition, the logging unit 263 may use the location information and the time stamp that are common in the MDT data corresponding to step S142 and the MDT data corresponding to step S143.

In step S147, the first measurement unit 261 confirms whether expiration of a measurement duration or transition to a connected state occurs. When there is the occurrence of the expiration of the measurement duration or the transition to the connected state, the logging process is ended. Meanwhile, when there is no occurrence of the completion of the measurement duration or the transition to the connected state, the procedure returns to step S141.

In addition, in step S145, the logging unit 263 logs only the MDT data corresponding to step S142. However, the logging unit 263 may log the MDT data corresponding to step S143.

(5) Effect of Embodiment

As described above, according to the present embodiment, when the RSRP or the RSRQ from the LTE base station eNB is smaller than a threshold value (that is, a coverage hole), the radio terminal UE, which received the measurement parameter set from the LTE base station eNB, logs a measurement result for RAT different from LTE and/or an LTE frequency band other than the frequency band to be measured, the location information, and the time stamp. In this way, it is possible to recognize whether a coverage hole at one frequency band of LTE is covered by another RAT and/or another frequency band.

Furthermore, in the present embodiment, the radio terminal UE logs frequency band information when radio environment measurement was performed with respect to the RAT different from LTE and/or the LTE frequency band other than the frequency band to be measured, together with the measurement result, the location information and the time stamp. Moreover, in the present embodiment, the radio terminal UE transmits, to the network, the UEInformation-Response message including the logged measurement result, location information, time stamp, and frequency band information. In this way, it is possible to recognize RAT and/or a frequency band that covers the coverage hole at one frequency band of LTE.

(6) Other Embodiments

While the present invention has been described by way of the foregoing embodiments, as described above, it should not be understood that the statements and drawings forming a part of this disclosure limit the invention. Further, various substitutions, examples, or operational techniques shall be apparent to a person skilled in the art on the basis of this disclosure.

For example, in the aforementioned embodiment, the mobile communication system configured on the basis of LTE-Advanced with specifications designed by 3GPP was mainly described. However, the present invention can also be applied to a mobile communication system and the like configured on the basis of W-CDMA (Wideband Code Division Multiple Access), as well as the LTE-Advanced. For example, a measurement parameter may be set from a W-CDMA (UMTS) base station to a radio terminal.

Thus, it must be understood that the present invention includes various embodiments that are not described herein.

In addition, the entire content of Japanese Patent Application No. 2010-227815 (filed on Oct. 7, 2010) is incorporated in the present specification by reference.

INDUSTRIAL APPLICABILITY

As described above, according to the radio measurement collection method and the radio terminal of the present invention, it is possible to recognize whether a coverage hole at one frequency band of one RAT is covered by another RAT and/or another frequency band, so that the radio measurement collection method and the radio terminal are available for radio communication such as mobile communication.

The invention claimed is:

1. A radio measurement collection method performed by a radio terminal, comprising the steps of:
   receiving, from a radio base station of a first radio access technology, a Minimization of Drive Test (MDT) configuration specific to the first radio access technology;
   in an idle state, performing radio environment measurement in accordance with the MDT configuration, wherein the radio terminal performs second measurement for a second radio access technology as well as first measurement for the first radio access technology even when the MDT configuration only configures the first measurement for the first radio access technology;
   in the idle state, logging measurement results of the radio environment measurement together with location information, wherein the radio terminal logs a second measurement result for the second radio access technology as well as a first measurement result for the first radio access technology so as to perform a report to a network; and
   transmitting the first measurement result and the second measurement result to the network, the second measurement result including information of frequency at which the second measurement is performed.

2. The radio measurement collection method according to claim 1, further comprising a step of transmitting, from the radio terminal to a radio base station of the first radio access technology, notification information indicating that the radio terminal has the measurement results, when the radio terminal is transitioned from the idle state to a connected state.

3. A radio terminal comprising:
   a receiver that receives, from a radio base station of a first radio access technology, a Minimization of Drive Test (MDT) configuration specific to the first radio access technology;
   a controller that, in an idle state,
      performs radio environment measurement in accordance with the MDT configuration, wherein the controller performs second measurement for a second radio access technology as well as first measurement for the first radio access technology, even when the MDT configuration only configures the measurement for the first radio access technology; and logs measurement results of the controller together with location information, wherein the controller logs a second measurement result for the second radio access technology as well as a first measurement result for the first radio access technology so as to perform a report to a network; and a transmitter that transmits the first measurement result and the second measurement result to the network, the second measurement result including information of frequency at which the second measurement is performed.

4. A processor for controlling a radio terminal, configured to:

receive, from a radio base station of a first radio access technology, a Minimization of Drive Test (MDT) configuration specific to the first radio access technology;

in an idle state, perform radio environment measurement in accordance with the MDT configuration, wherein the processor performs second measurement for a second radio access technology as well as first measurement for the first radio access technology, even when the MDT configuration only configures the measurement for the first radio access technology;

in the idle state, log measurement results of the radio environment measurement together with location information, wherein the processor logs a second measurement result for the second radio access technology as well as a first measurement result for the first radio access technology so as to perform a report to a network; and transmit the first measurement result and the second measurement result to the network, the second measurement result including information of frequency at which the second measurement is performed.

* * * * *